(12) United States Patent
Harvey

(10) Patent No.: US 9,392,783 B1
(45) Date of Patent: Jul. 19, 2016

(54) FISH ALERT DEVICE FOR A FISHING ROD

(71) Applicant: Timothy P. Harvey, Goldsboro, NC (US)

(72) Inventor: Timothy P. Harvey, Goldsboro, NC (US)

( * ) Notice: Subject to any disclaimer, the term of this patent is extended or adjusted under 35 U.S.C. 154(b) by 91 days.

(21) Appl. No.: 14/322,149

(22) Filed: Jul. 2, 2014

Related U.S. Application Data

(60) Provisional application No. 61/920,147, filed on Dec. 23, 2013.

(51) Int. Cl.
*A01K 97/12* (2006.01)

(52) U.S. Cl.
CPC ........................ *A01K 97/12* (2013.01)

(58) Field of Classification Search
CPC ........................................ A01K 97/12
USPC .............................................. 43/17
See application file for complete search history.

(56) References Cited

U.S. PATENT DOCUMENTS

| | | | | |
|---|---|---|---|---|
| 1,131,508 A | * | 3/1915 | Hall | A01K 97/10 43/17 |
| 1,503,967 A | * | 8/1924 | Subert | A01K 97/12 43/17 |
| 1,516,484 A | * | 11/1924 | Meszaros | A01K 97/12 43/17 |
| 2,601,839 A | * | 7/1952 | Kucewicz | A01K 97/12 43/17 |
| 2,641,079 A | * | 6/1953 | Oster | A01K 97/12 43/17 |
| 2,921,399 A | | 1/1960 | Huliew | |
| 3,584,408 A | * | 6/1971 | Frick | A01K 97/10 43/17 |
| 3,814,048 A | * | 6/1974 | Bartholomew | A01K 97/01 43/17 |
| 4,380,883 A | * | 4/1983 | Greaux | A01K 97/12 43/17 |
| 4,399,630 A | | 8/1983 | Lawes | |
| 4,573,281 A | * | 3/1986 | Moisan | A01K 97/12 43/17 |
| 7,040,052 B1 | | 5/2006 | Paulk | |
| D534,449 S | * | 1/2007 | Cordeiro | D10/116.1 |
| 7,624,531 B2 | | 12/2009 | Kirby | |

FOREIGN PATENT DOCUMENTS

| | | | | |
|---|---|---|---|---|
| DE | 3308650 A1 | * | 9/1984 | ............. A01K 97/12 |
| DE | 19627590 A1 | * | 1/1998 | ............. A01K 97/12 |
| FR | 2823419 A1 | * | 10/2002 | ............. A01K 97/12 |
| JP | 10113111 A | * | 5/1998 | |
| JP | 2000342147 A | * | 12/2000 | |
| JP | 2004166680 A | * | 6/2004 | |
| JP | 2004313163 A | * | 11/2004 | |
| KR | 101168526 B1 | * | 7/2012 | |

OTHER PUBLICATIONS

Eagle Claw Stainless Steel Fishing Bell, http://www.eagleclaw.com/product/accessories/stainless-fishing-bell.*

* cited by examiner

*Primary Examiner* — Darren W Ark
(74) *Attorney, Agent, or Firm* — Robert C. Montgomery; Montgomery Patent & Design LLC

(57) ABSTRACT

A fish alert device for a fishing rod provides a means to alert a fisherman of a fish on the line. The device includes an alert bell and a housing which is adaptable to an existing fishing rod that provides an alarm sound upon catching a fish. The device allows a user to cast and re-cast without needing to remove the device.

14 Claims, 3 Drawing Sheets

FISH ALERT DEVICE FOR A FISHING ROD

RELATED APPLICATIONS

The present invention was first described in and claims the benefit of U.S. Provisional Application No. 61/920,147, filed Dec. 23, 2013, the entire disclosures of which are incorporated herein by reference.

FIELD OF THE INVENTION

The present invention relates generally to a means to alert a fisherman of a fish strike on the line includes an alert bell and a housing adaptable for attachment on an existing fishing rod.

BACKGROUND OF THE INVENTION

The technology used by anglers to catch fish has become increasingly complex in nature. Fishermen no longer rely on the traditional hook and worm approach to attract their game. Instead, a broad range of products have hit the market, designed to aid the fisherman to catch more fish in a shorter period of time. In general, fishermen have to hold the fishing rod no matter the additional technologies utilized. While some may argue that this is a perfect way to spend a day, long periods of holding a rod while nothing is happening is boring and tedious. As a result, many fishermen resort to attaching or bracing their rod against something while waiting for a fish to bite. While this method may work, it often results in a lost catch or even a lost fishing rod if a fish should strike when the fisherman is away or unaware. Therefore, there is a need for an alerting means attachable to a fishing rod that alerts a fisherman of a fish strike.

SUMMARY OF THE INVENTION

The disadvantages of the prior art are overcome by the present invention in providing an alert device for fishing that includes a housing that is adapted to be affixed to a fishing rod. The housing includes a balance arm operatively disposed on the housing at a pivot point and a bell operatively disposed on the balancing arm. The housing transfers a movement induced into the fishing rod to the balance arm causing the balance arm to pivot about the pivot point in response to the movement. When the balance arm pivots from the induced movement in the fishing rod the bell rings as an audible alarm. In this manner, the present invention overcomes the disadvantages of the prior art and fulfills the need discussed above.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
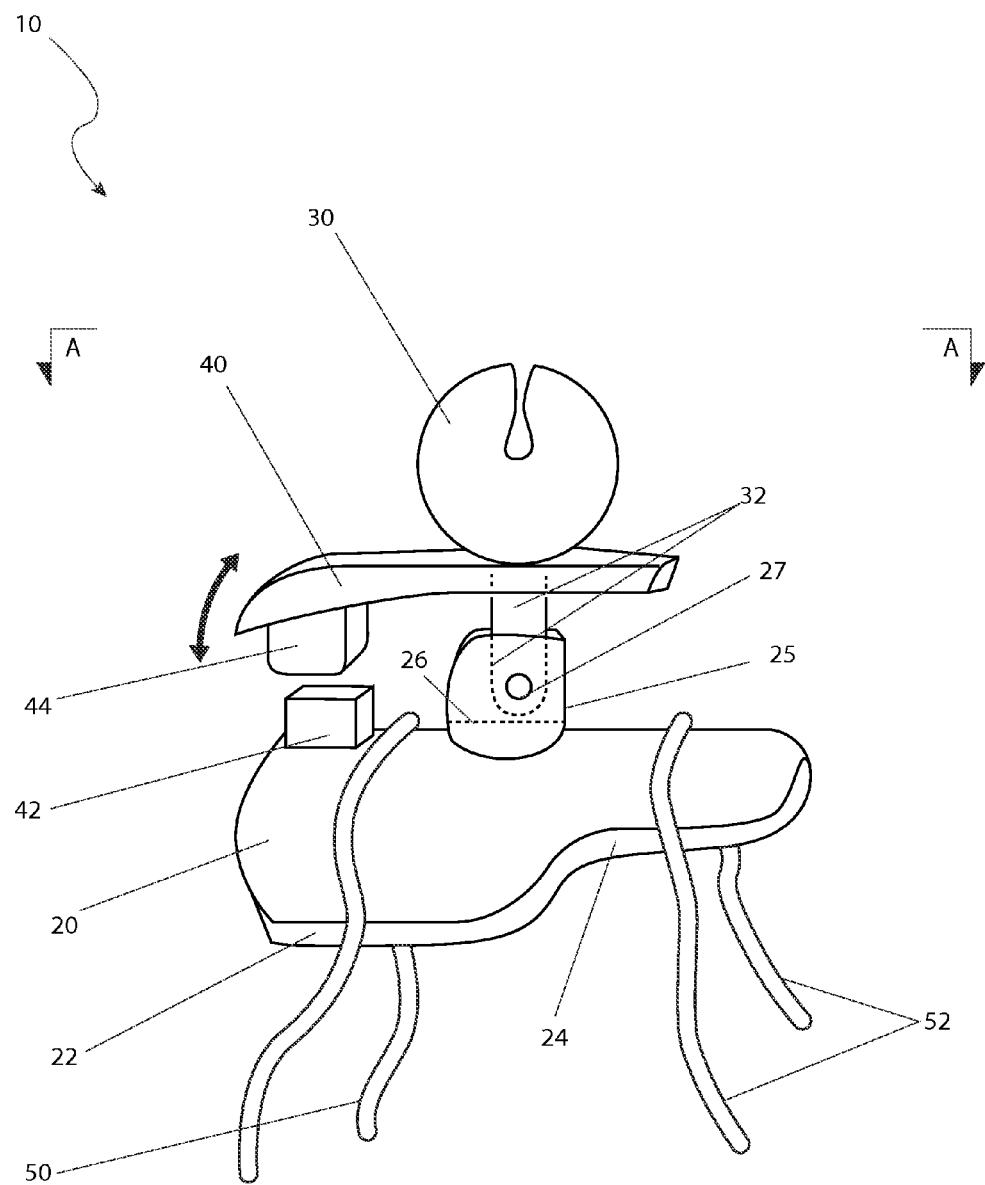
FIG. 1 is a perspective view of a fish alert device for a fishing rod 10, according to a preferred embodiment of the present invention.

DESCRIPTIVE KEY 10 fish alert device
20 housing
22 first slot
24 second slot
25 balance arm support
26 pivot aperture
27 pivot pin
30 bell
32 pivot arm
34 pea
40 balance arm
42 housing magnet
44 balance arm magnet
52 second fastening wire
60 audible alarm sound
80 fastener
82 adhesive bond
100 fishing rod
105 fishing line
110 rod eyelet

DETAILED DESCRIPTION OF THE PREFERRED EMBODIMENT

Figure 2:
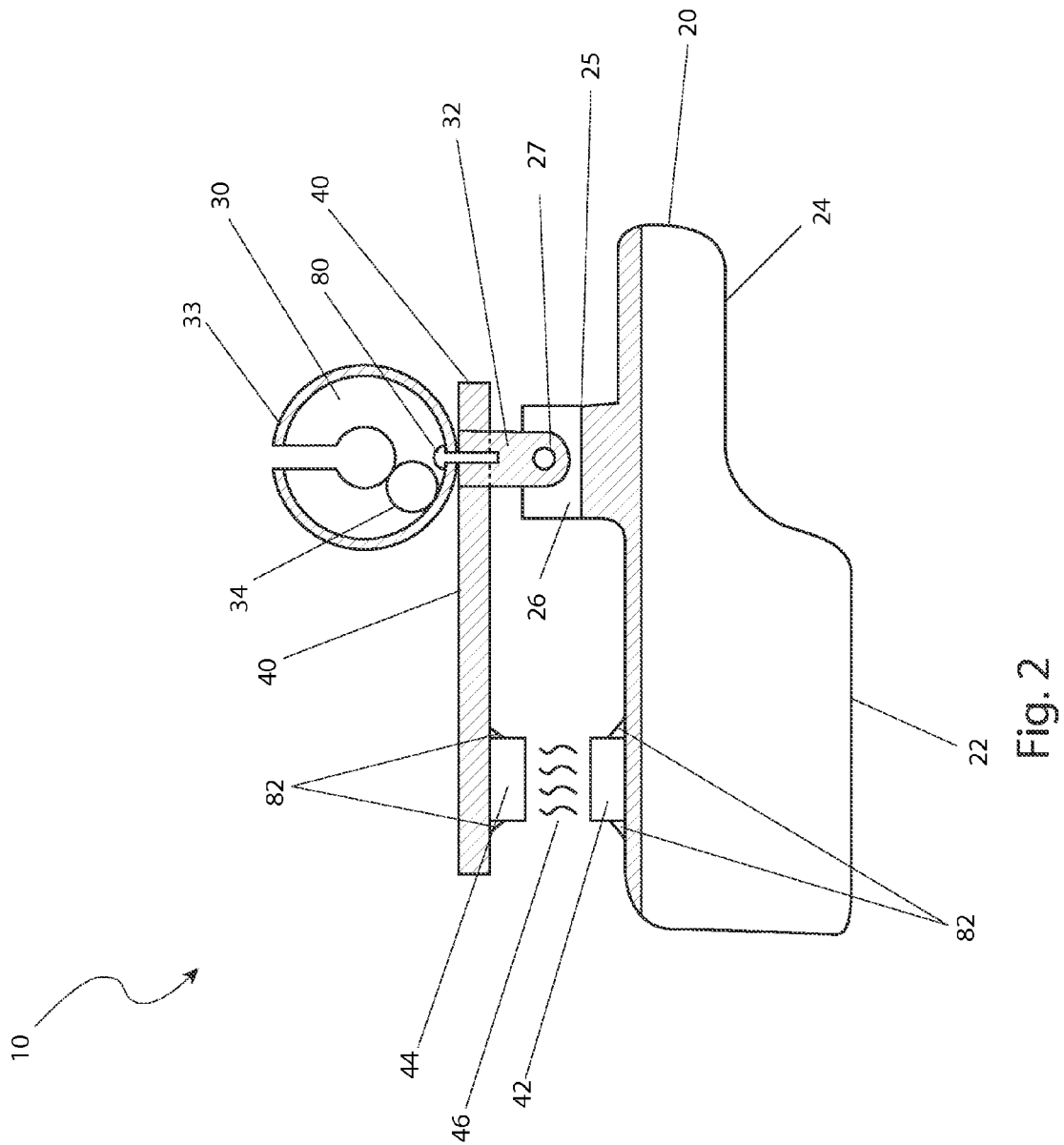
FIG. 2 is a sectional view of the fish alert device for a fishing rod 10 taken along section line A-A (see FIG. 1), according to a preferred embodiment of the present invention; and, FIG. 3 is an environmental view of the fish alert device for a fishing rod 10, according to a preferred embodiment of the present invention.
Figure 3:
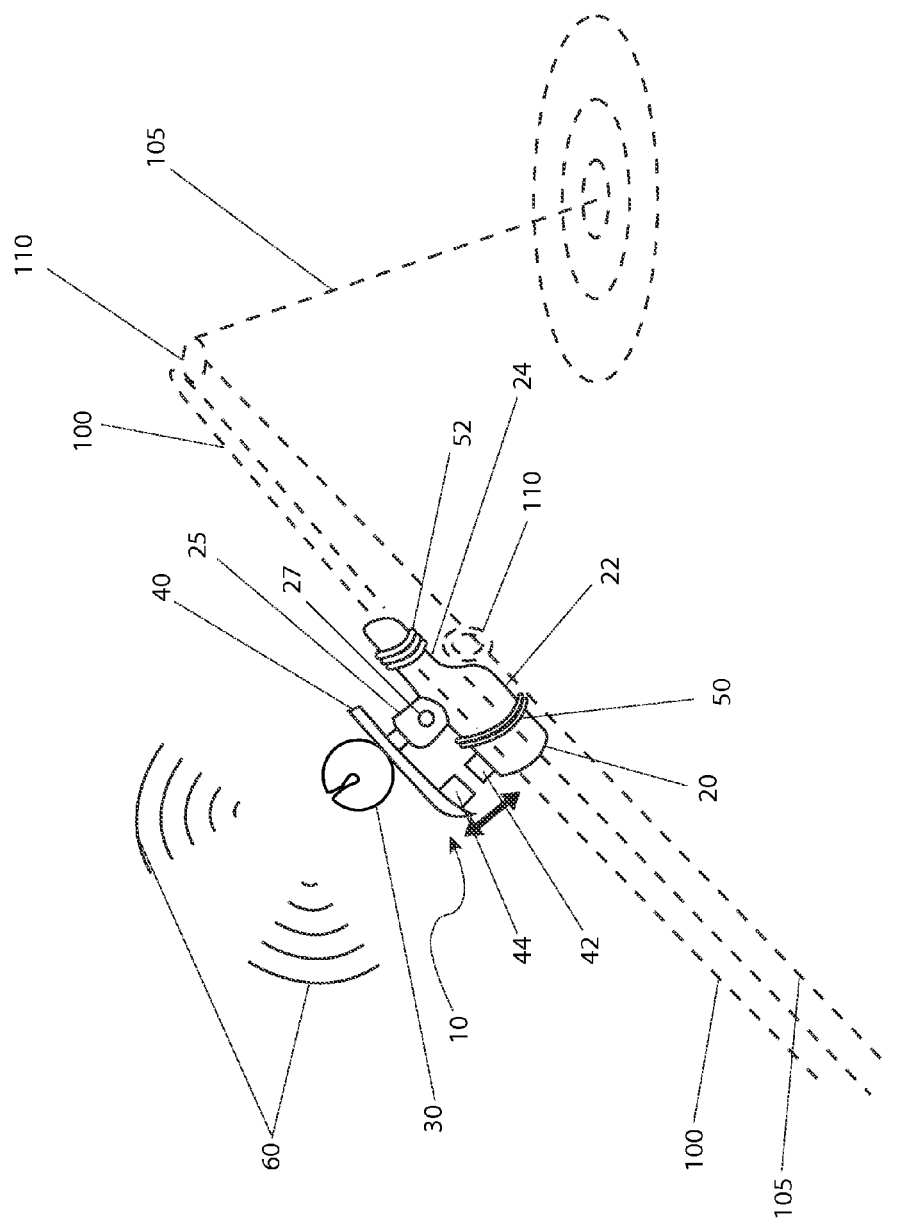

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a fish alert device for a fishing rod (herein described as the "device") 10, which provides an alert bell 30 and a housing 20 adaptable to be selectively affixed to an existing fishing rod 100. The alert bell 30 provides an audible alarm sound 60 if a fish is on the line 105 and causes the fishing rood 100 to move. The device 10 allows a user to cast and re-cast without needing to remove the device 10.

Referring now to the FIGS. 1, 2, and 3, perspective, sectional, and environmental views of the device 10, according to a preferred embodiment of the present invention, are disclosed. The device 10 comprises a housing 20, a bell 30, and a balancing arm 40. The device 10 is envisioned to be introduced in several models having housings 20 being adaptable to different fishing rods 100 having various diameters, and as such should not be interpreted as a limiting factor of the device 10. The housing 20 is envisioned to be made of a buoyant material such as wood, dense polystyrene, lightweight plastic, or the like, to prevent loss if dropped into water.

The device 10 provides a means for removable attachment to a fishing rod 100 via housing 20. In the preferred embodiment, the housing 20 is formed of flexible plastic in a generally curved, partial cylindrical, shape having a first slot portion 22 that extends longitudinally along the underside surface of the housing 20. The housing 20 further includes a second slot portion 24 concomitant to the first slot portion 22, but having a reduced circumference that will be discussed in greater detail below. A balance arm support 25 is formed along the top surface of the housing 20 and comprises a vertically extending cylindrical form having a pivot aperture 26 formed into a top and side surface. A pivot pin 27 passes through the balance arm support 25 and a pivot arm 32 and provides an axis of rotation. In this manner, the pivot arm 32 is secured within the pivot aperture 26 of the balance arm support 25 and the pivot aperture 26 is sized accordingly to allow the pivot arm 32 to pivot about the pivot pin 27.

The pivot arm 32 extends upwardly from the balance arm support 25 and further comprises a longitudinally extending balancing arm 40. The pivot arm 32 and balancing arm 40 are envisioned to comprise a unitary member being produced in a plastic injection-molding process. The bell 30 comprises a hollow metal spherical ringing body 33 having an internal spherical metal ball or "pea" 34 adapted to move within and make contact with the body 33 to produce an audible output. The bell 30 is envisioned to be affixed to a top surface of the balancing arm 40 using a fastener 80 such as a rivet or the like. The bell 30, pivot arm 32, and balancing arm 40 are free to pivot about the pivot pin 27 as a unitary member in response to movement of the fishing rod 100 as generated by a fish on the fishing line 105. The device 10 being secured to the fishing rod 100 by a first and second fastening wire 50 and 52 that are operatively coiled around the housing 20 and the fishing rod 100.

The device 10 also provides a means to enhance the pivoting motion of the balancing arm 40 and attached bell 30 via a magnetic field 46 which is produced by a housing magnet 42 and a balance arm magnet 44. The magnets 42, 44 are envisioned to be small rectangular-shaped permanent magnets. The housing magnet 42 is mounted to a top surface of the housing 20, and the balance arm magnet 44 is mounted to a bottom surface of the balancing arm 40 in a vertically corresponding manner. The magnets 42, 44 are preferably affixed to the surfaces during manufacturing using an adhesive bond 82 or equivalent means. The magnets 42, 44 are aligned vertically having a slight gap between them when the balancing arm 40 is parallel to the housing 20. The magnets 42, 44 are arranged having respective like magnetic poles facing each other so as to repel each other and act as a magnetic spring. This enhances the motion of the balancing arm 40 and causes greater response by the bell 30 when the balancing arm is in motion providing an increased intensity of the resulting alarm sound 60.

Referring now to FIG. 3, the device 10 is shown affixed to the existing fishing rod 100 via the slotted housing 20. To utilize the device 10, a fishing rod 100 has its fishing line 105 extended into a body of water awaiting a strike from a fish with the rod axially oriented so that the rod eyelets 110 are on the lower or downward side of the rod 100 opposite the device 10. The first and second slots 22, 24 of the housing 20 are positioned on an intermediate shaft portion of the fishing rod 100 so that the first slot 22 is secured to the main body of the rod and the second slot 24 provides clearance for the downwardly orientated rod eyelet 110. In this manner, the device 10 is placed in a non-rotating manner on the fishing rod 100 while orienting the bell 30 in an upright position. To secure the device 10 on the fishing rod 100, the first fastening wire 50 is coiled around a rear portion of the housing 20 and a second fastening wire 52 is coiled around a forward portion of the housing 20. The wires 50, 52 are envisioned to be made using a length of corrosion-resistant ductile metal wire such as stainless steel or the like, having an approximate wire gauge of twenty-two (22) or twenty-six (26), and being durable enough to provide repeated use upon a number of fishing rods 100 before needing to be replaced.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 3. The method of installing and utilizing the device 10 may be achieved by performing the following steps: procuring a model of the device 10 having a housing 20 which is correspondingly sized with regards to the diameter of an existing fishing rod 100; installing the device 10 onto an intermediate portion of the fishing rod 100 by inserting said fishing rod 100 through the first slot 22; sliding the device 10 forwardly along the fishing rod 100 until a rod eyelet 110 is positioned within the second slot 24; securing the device 10 to the fishing rod 100 by wrapping the first 50 and second 52 fastening wires around rear and front portions of the housing 20, respectively; participating in a fishing activity using the fishing rod 100 in an anchored or "hand-held" manner until hooking a fish; responding to the enhanced audible alarm sound 60 from the bell 30 which results from the motioning of the fishing rod 100 by the fish; reeling in the fish in a normal manner; repeating the above steps as desired; and, benefiting from an improved fish alarming method afforded a user of the present invention 10. It is understood that the first 50 and second 52 fastening wires may be unwound and the device 10 removed from the fishing rod 100. The device 10 may be subsequently used a number of times upon similar fishing rods 100, as desired, by following the previous steps.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. An alert device for fishing, comprising:
 a housing adapted to be affixed to a fishing rod;
 a balance arm;
 a pivot arm operatively affixed to and extending from said balance arm;
 a balance arm support adapted to extend from said housing, comprising:
  a pivot aperture having said pivot arm disposed therein; and,
  a pivot pin;
  wherein said pivot arm is affixed to said pivot pin and pivots within said pivot aperture; and,
 a bell operatively disposed on said balance arm;
 wherein said housing transfers a movement induced in said fishing rod to said balance arm;
 wherein said balance arm pivots about said pivot pin in response to said movement; and,
 wherein said bell rings as an audible alarm when said balance arm pivots.

2. The device of claim 1, wherein said housing further comprises:
  a cylindrically shaped body;
  a first slot formed longitudinally in an underside of said housing;
  a second slot formed concomitant with said first slot;
  wherein said first slot and said second slot are constructed to be received by and retained on a shaft portion of a fishing rod.

3. The device of claim 1, wherein said device further comprises:
  a housing magnet operatively affixed to said housing; and,
  a balance arm magnet operatively affixed to said balance arm in juxtaposition to said housing magnet such that said housing magnet and said balance arm magnet repel each other.

4. The device of claim 1, wherein said bell further comprises:
  a hollow spherical body; and,
  a pea operatively disposed within said hollow body;
  wherein said pea is caused to move within and come in contact with said hollow body in response to said movement; and,
  wherein said contact produces said audible alarm.

5. The device of claim 1, wherein said housing further comprises a fastening wire means adapted to be wrapped around said fishing rod to secure said device to said fishing rod.

6. An alert device for fishing, comprising:
  a housing adapted to be affixed to a fishing rod, comprising:
    a cylindrically shaped body;
    a first slot formed longitudinally in an underside of said housing; and,
    a second slot formed concomitant with said first slot;
    wherein said first slot and said second slot are constructed to be received by and retained on a shaft portion of said fishing rod;
  a balance arm support affixed to and extending from said housing, said balance arm support having a pivot pin;
  a balance arm;
  a pivot arm operatively affixed to said balance arm and extending into said balance arm support, said pivot arm affixed to said pivot pin; and,
  an alarm operatively disposed on said balance arm;
  wherein said housing transfers a movement induced in said fishing rod to said balance arm;
  wherein said balance arm pivots about said pivot pin in response to said movement; and,
  wherein said alarm sounds when said balance arm pivots.

7. The device of claim 6, wherein said balance arm support further comprises a pivot aperture having said pivot arm disposed therein, and wherein said pivot arm pivots within said pivot aperture.

8. The device of claim 6, wherein said device further comprises:
  a housing magnet operatively affixed to said housing; and,
  a balance arm magnet operatively affixed to said balance arm in juxtaposition to said housing magnet such that said housing magnet and said balance arm magnet repel each other.

9. The device of claim 6, wherein said housing further comprises a fastening wire means adapted to be wrapped around said fishing rod to secure said device to said fishing rod.

10. An alert device for fishing, comprising:
  a housing adapted to be affixed to a fishing rod comprising:
    a cylindrically shaped body;
    a first slot formed longitudinally in an underside of said housing;
    a second slot formed concomitant with said first slot; and,
    a housing magnet operatively affixed to said housing;
  a balance arm support affixed to and extending from said housing;
  a balance arm operatively affixed to a pivot point within said balance arm support;
  a bell operatively disposed on said balance arm; and,
  a balance arm magnet operatively affixed to said balance arm in juxtaposition to said housing magnet;
  wherein said first slot and said second slot of said housing are constructed to be received by and retained on a shaft portion of said fishing rod;
  wherein said housing magnet and said balance arm magnet repel each other;
  wherein said housing transfers a movement induced into said fishing rod to said balance arm;
  wherein said balance arm pivots about said pivot point in response to said movement; and,
  wherein said alarm sounds when said balance arm pivots.

11. The device of claim 10, wherein said housing further comprises a pivot arm operatively affixed to and extending from said balance arm;
  wherein said pivot arm operatively affixes said balance arm to said pivot point.

12. The device of claim 11, wherein said balance arm support further comprises:
  a pivot aperture having said pivot arm disposed therein; and,
  a pivot pin;
  wherein said pivot pin act as said pivot point; and,
  wherein said pivot arm pivots within said pivot aperture.

13. The device of claim 10, wherein said bell further comprises:
  a hollow spherical body; and,
  a pea operatively disposed within said hollow body;
  wherein said pea is caused to move within and come in contact with said hollow body in response to said movement; and,
  wherein said contact produces an audible alarm.

14. The device of claim 10, wherein said housing further comprises a fastening wire means adapted to be wrapped around said fishing rod to secure said device to said fishing rod.

* * * * *